(12) United States Patent
Youngquist et al.

(10) Patent No.: US 8,947,074 B1
(45) Date of Patent: Feb. 3, 2015

(54) INDUCTIVE POSITION SENSOR

(71) Applicant: The United States of America as Represented by the Administrator of the National Aeronautics and Space Administration, Washington, DC (US)

(72) Inventors: Robert C. Youngquist, Cocoa, FL (US); Stephen M. Simmons, Melbourne, FL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 140 days.

(21) Appl. No.: 13/827,457

(22) Filed: Mar. 14, 2013

Related U.S. Application Data

(63) Continuation-in-part of application No. 12/961,344, filed on Dec. 6, 2010, now abandoned.

(60) Provisional application No. 61/267,130, filed on Dec. 7, 2009.

(51) Int. Cl.
*G01B 7/14* (2006.01)
*G01B 7/00* (2006.01)

(52) U.S. Cl.
CPC .................................... *G01B 7/003* (2013.01)
USPC ...................................................... 324/207.16

(58) Field of Classification Search
USPC ........................................ 324/207.16, 207.17
See application file for complete search history.

(56) References Cited

U.S. PATENT DOCUMENTS

| 3,178,696 A | 4/1965 | Claftin, Jr. |
| 5,617,023 A | 4/1997 | Skalski |

*Primary Examiner* — Melissa Koval
*Assistant Examiner* — Daniel Miller
(74) *Attorney, Agent, or Firm* — Michelle L. Ford; Peter J. VanBergen

(57) ABSTRACT

An inductive position sensor uses three independent inductors inductively coupled by a common medium such as air. First and second inductors are separated by a fixed distance with the first inductor's axial core and second inductor's axial core maintained parallel to one another. A third inductor is disposed between the first and second inductors with the third inductor's axial core being maintained parallel to those of the first and second inductors. The combination of the first and second inductors are configured for relative movement with the third inductor's axial core remaining parallel to those of the first and second inductors as distance changes from the third inductor to each of the first inductor and second inductor. An oscillating current can be supplied to at least one of the three inductors, while voltage induced in at least one of the three inductors not supplied with the oscillating current is measured.

10 Claims, 1 Drawing Sheet

INDUCTIVE POSITION SENSOR

CROSS-REFERENCE TO RELATED APPLICATIONS

This application is a continuation-in-part application claiming the benefit of U.S. patent application Ser. No. 12/961,344 filed on Dec. 6, 2010, which further claims the benefit under 35 U.S.C. §119(e) of U.S. Provisional Application Ser. No. 61/267,130 filed Dec. 7, 2009, the contents of which are incorporated herein by reference.

ORIGIN OF INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore.

BACKGROUND OF THE INVENTION

1. Field of the Invention

The present invention is directed to position sensors, and more particularly to an inductive position sensor using three parallel inductors.

2. Description of Related Art

A variety of position sensors are known in the art. Examples include capacitance-based position sensors, laser-based position sensors, eddy-current sensing position sensors, and linear displacement transducer-based position sensors. While each type of position sensor has its advantages, each also presents disadvantages for some applications. For example, the size of capacitors can make their use impractical when the position sensor must be small in size. The same is true for linear displacement transducers. The complexity and/or cost of laser-based sensors and eddy-current-based sensors can negate their advantages in a number of applications.

BRIEF SUMMARY OF THE INVENTION

The present invention is directed to an inductive position sensor that uses three inductors. Each of the three inductors is a mechanically independent inductor structure. The three inductors are immersed in a common medium, such as air, so that they are inductively coupled through this medium. A first support is coupled to a first inductor and a second inductor such that they are separated by a fixed distance with the first inductor's axial core and second inductor's axial core maintained parallel to one another. A second support is coupled to the third inductor for disposing the third inductor between the first inductor and second inductor with the third inductor's axial core being maintained parallel to the first inductor's axial core and the second inductor's axial core. The first support and second support are configured for relative movement therebetween with the first inductor's axial core, the second inductor's axial core, and the third inductor's axial core remaining parallel to one another during the relative movement as distance changes from the third inductor to each of the first inductor and second inductor. In operation, a source supplies an oscillating current to at least one of the three inductors, while another device measures voltage induced in at least one of the three inductors not supplied with the oscillating current. The voltage so-induced is indicative of an amount of the relative movement between the third inductor and the combination of the first and second inductors.

BRIEF DESCRIPTION OF THE DRAWING

The features and advantages of the present invention will become apparent from the following detailed description of a preferred embodiment thereof, taken in conjunction with the accompanying drawing, in which.

DETAILED DESCRIPTION OF THE INVENTION

Figure 1:
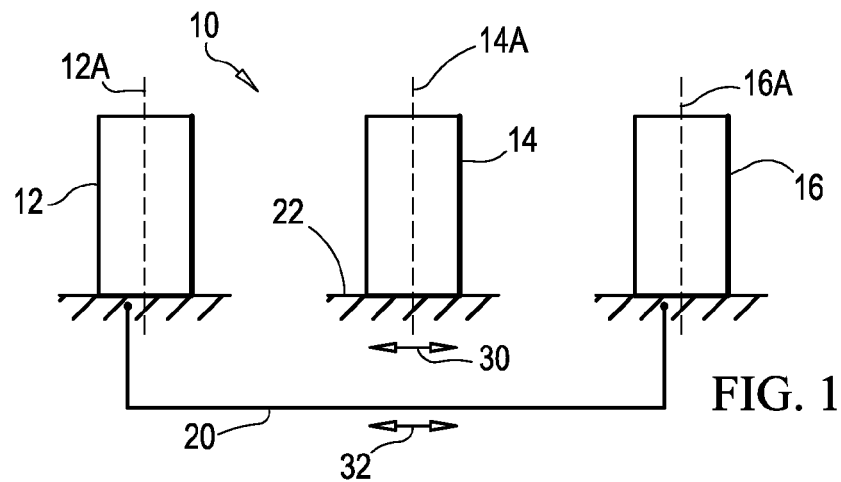
FIG. 1 is a schematic view of an inductive position sensor in accordance with an embodiment of the present invention.

Referring now to the drawing and more particularly to FIG. 1, an inductive position sensor in accordance with an embodiment of the present invention is shown and is referenced generally by numeral 10. For clarity of illustration, only the mechanical aspects of inductive position sensor 10 are illustrated in FIG. 1. The electrical aspects in various embodiments of inductive position sensor 10 will be presented later herein.

Inductive position sensor 10 uses spaced-apart and adjacent inductors 12, 14, and 16. For purposes of the present invention, each of inductors 12, 14, and 16 is essentially a coil of wire wrapped about its own separate and mechanically independent ferromagnetic core in accordance with constructions well known and understood in the art. That is, the inductors used in the present invention are not torroidal inductors. The coil and ferromagnetic core are omitted from the figures for clarity of illustration. However, as is also well known and understood in the art, an imaginary axis extending through a cylindrical inductor's ferromagnetic core wrapped by its coil defines an inductor's longitudinal axis that is referenced in each inductor 12, 14, and 16 by a dashed line 12A, 14A, and 16A, respectively. In accordance with the present invention, inductors 12, 14, and 16 are positioned such that their longitudinal axes 12A, 14A, and 16A are parallel to one another and lie within a common plane, e.g., the plane of the paper in the illustrated example.

Each of inductors 12, 14, and 16 is a mechanically independent inductor structure so that no magnetic material is shared by the inductors. That is to say, any inductive coupling of magnetic fields associated with each of inductors 12, 14, and 16 occurs only through the medium (e.g., air) in which inductors 12, 14, and 16 are immersed. This greatly simplifies construction of position sensor 10 since conventional off-the-shelf inductors can be used.

The outermost inductors 12 and 16 are mechanically fixed in their relationship to one another by, for example, a support 20 that can be a specially-designed support or can be part of an object (not shown) whose position is to be sensed by sensor 10. Inductor 14 disposed between inductors 12 and 16 can be mechanically coupled to a support 22 that can be a specially designed support or can be part of an object (not shown) whose position is to be sensed by sensor 10. Supports 20 and 22 are configured for one-dimensional relative movement therebetween such that inductor 14 experiences relative movement with respect to the combination of inductors 12 and 16. Accordingly, support 20 could be stationary and support 22 could be configured for one-dimensional movement in the common plane defined by axes 12A, 14A, and 16A as indicated by two-headed arrow 30. Alternatively, support 22 could be stationary and support 20 could be configured for one-dimensional movement in the common plane defined by axes 12A, 14A, and 16A as indicated by two-headed arrow 32.

The above-described mechanical aspects of inductive position sensor 10 are incorporated with electrical features to provide position sensing capability. Two possible electrical connection scenarios will be described with the aid of FIGS. 2 and 3. For clarity of illustration, the above-described mechanical aspects are not illustrated in FIGS. 2 and 3. However, it is to be understood that these mechanical aspects are included in the electrical connection scenarios depicted in FIGS. 2 and 3.

Figure 2:
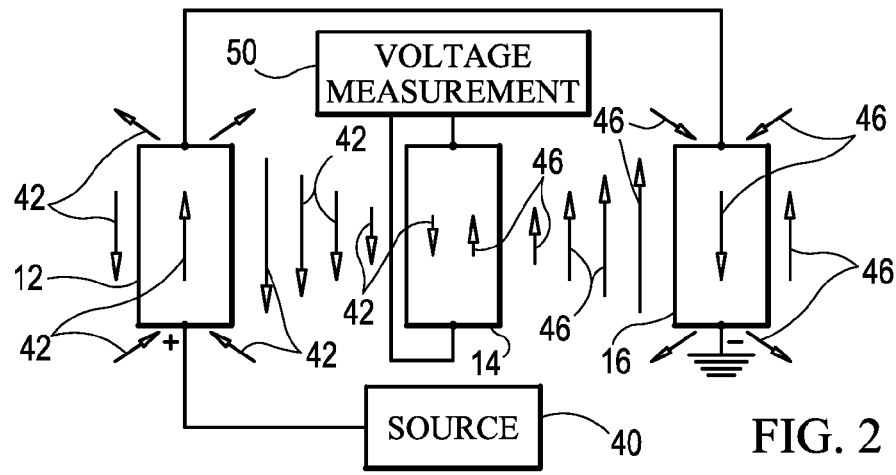
FIG. 2 is a schematic view of the inductive position sensor with current source and voltage measurement devices coupled thereto in accordance with an embodiment of the present invention.

Referring first to FIG. 2, a source 40 of an oscillating electric current is electrically coupled to the outermost inductors 12 and 16. More specifically, the electric current supplied to inductor 12 is of opposite polarity to that supplied to inductor 16. While source 40 is representative of one or more sources, the oscillating current supplied to inductors 12 and 16 should be of the same magnitude and phase. As a result, magnetic fields are produced by inductors 12 and 16. The magnetic field produced by inductor 12 is referenced by magnetic field lines 42 while the magnetic field produced by inductor 16 is referenced by magnetic field lines 46. Magnetic fields 42 and 46 decrease in a non-linear fashion with distance from respective axes 12A and 16A as would be understood in the art.

In the FIG. 2 embodiment, inner inductor 14 is coupled to a voltage measurement device 50 (e.g., meter, oscilloscope, etc.) capable of measuring voltage induced in inductor 14 based on its position relative to inductors 12 and 16. That is, the induced voltage and its polarity are indicative of the relative position of inductor 14 as compared to inductors 12 and 16. While the drop-off in each of magnetic fields 42 and 46 is non-linear, tests of the present invention have yielded the unexpected result that the voltage induced in inductor 14 is highly linear as the air (or other media of immersion) gaps between inductor 14 and inductors 12 and 16 change. This linear response minimizes output processing requirements as a simple voltage measurement indicates the relative positions of inductors 12, 14, and 16. Furthermore, a linear response means that the resolution of the sensor will be approximately constant regardless of the position of inductor 14 relative to the combination of inductors 12 and 16. This will be true regardless of whether inductor 14 moves relative to inductors 12 and 16, or the fixed-relationship combination of inductors 12 and 16 moves relative to inductor 14.

Figure 3:
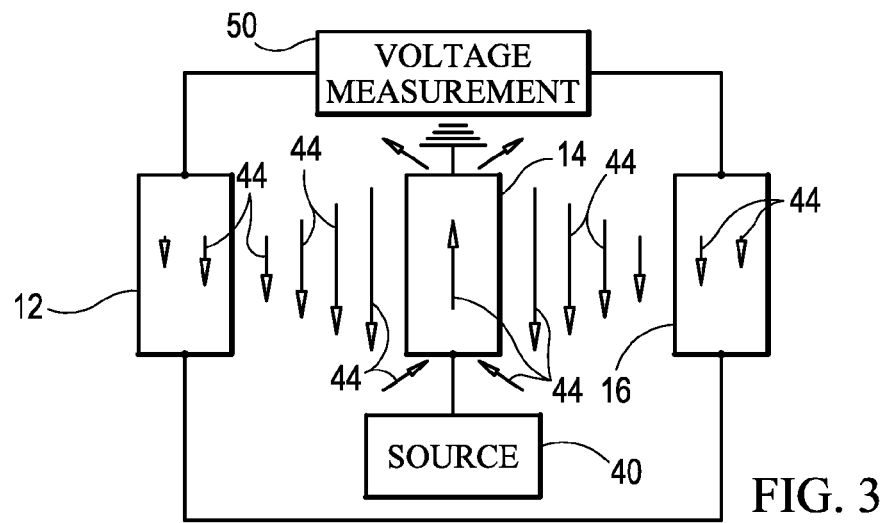
FIG. 3 is a schematic view of the inductive position sensor with current source and voltage measurement devices coupled thereto in accordance with another embodiment of the present invention.

Another electrical connection scenario for the present invention is presented in FIG. 3 where source 40 supplies an oscillating current to just inner inductor 14 while voltage measurement device 50 is coupled to outer inductors 12 and 16. In this embodiment, a magnetic field 44 is produced by inductor 14. Voltage measurement device 50 is coupled to inductors 12 and 16 such that induced voltage of one polarity is measured at inductor 12, whereas the induced voltage of an opposing polarity is measured at inductor 16. The magnitudes of the measured voltages are indicative of the position of inductor 14 relative to inductors 12 and 16. Voltage measurement device 50 can be realized by a single device or two separate devices without departing from the scope of the present invention.

The cylindrical inductors used in the various embodiments of the present invention can be of any conventional design, e.g., standard cylindrical, dumb-bell shaped, etc. Their physical size and inductance can be selected to satisfy the requirements of a particular application. In general, the frequency of the supplied oscillating current should be large enough, such that the impedance of the current-driven inductor(s) is large compared to their total resistance. Further, for best sensitivity, the inductor(s) serving as the voltage measurement or pick-up inductors should be (magnetically) unshielded inductors. Of course, all three of the inductors could be unshielded. The outermost inductors 12 and 16 (or all three inductors) can be, but need not be, identical in terms of their inductance value (to within normal/acceptable tolerances) in order to simplify drive and/or measurement electronics. However, it is to be understood that the present invention could be practiced using inductors 12 and 16 having different inductance values, although this may require adjustments in one or more of the drive currents, inductor core materials, etc., to make the ultimate position sensor perform as needed.

A variety of other electrical connection scenarios could also be used without departing from the scope of the present invention. For example, since the drive and measurement signals are oscillatory, a synchronous detection system (e.g., one using a lock-in amplifier) can be used when monitoring the output voltage of the pick-up inductor(s). That is, the drive signal from the source can also be supplied to a lock-in amplifier-based voltage measurement device. As is known in the art, the lock-in amplifier uses the drive signal as a reference in order to synchronize the voltage measurement. This will improve the signal-to-noise ratio of the position sensor as would be understood by one of ordinary skill in the art.

The advantages of the present invention are numerous. The position sensor and its drive/measurement electronics are simple to design and construct using conventional off-the-shelf components. The sensor's linear operating range further simplifies processing requirements and guarantees high resolution. The sensors can be adapted to a variety of small-scale and large-scale applications.

Although the present invention has been disclosed in terms of a number of preferred embodiments, it will be understood that numerous modifications and variations could be made thereto without departing from the scope of the invention as defined by the following claims.

We claim:

1. An inductive position sensor, comprising:
a first inductor having a first axial core;
a second inductor having a second axial core;
a third inductor having a third axial core;
each of said first inductor, said second inductor, and said third inductor being a mechanically independent inductor structure;
a first support coupled to said first inductor and said second inductor for separating said first inductor and said second inductor by a fixed distance with said first axial core and said second axial core maintained parallel to one another and defining a plane;
a second support coupled to said third inductor for disposing said third inductor between said first inductor and said second inductor with said third axial core maintained parallel to said first axial core and said third axial core and lying in the plane defined by the first and second inductors;
said first inductor, said second inductor, and said third inductor immersed in a common medium wherein said first inductor, said second inductor, and said third inductor are inductively coupled through said common medium; and said first support and said second support configured for one-dimensional relative movement therebetween wherein said first axial core, said second axial core, and said third axial core remain parallel to one another during said relative movement as distance changes from said third inductor to each of said first inductor and said second inductor.

2. An inductive position sensor as in claim 1, wherein at least one of said first inductor, said second inductor, and said third inductor comprises an unshielded inductor.

3. An inductive position sensor as in claim 1, wherein each of said first inductor, said second inductor, and said third inductor comprises an unshielded inductor.

4. An inductive position sensor as in claim 1, wherein said first inductor and said second inductor have the same inductance value.

5. An inductive position sensor as in claim 1, wherein said first inductor, said second inductor, and said third inductor have the same inductance value.

6. An inductive position sensor as in claim 1, further comprising:
   a source for supplying an oscillating current to said first inductor and said second inductor with a polarity of said oscillating current supplied to said first inductor being opposite to a polarity of said oscillating current supplied to said second inductor; and
   a device coupled to said third inductor for measuring voltage induced in said third inductor when said oscillating current is supplied to said first inductor and said second inductor.

7. An inductive position sensor as in claim 1, further comprising:
   a source for supplying an oscillating current to said third inductor; and
   a device coupled to said first inductor and said second inductor for measuring voltage induced in each of said first inductor and said second inductor when said oscillating current is supplied to said third inductor.

8. An inductive position sensor, comprising:
   a first inductor having a first axial core;
   a second inductor having a second axial core;
   a third inductor having a third axial core;
   each of said first inductor, said second inductor, and said third inductor being a mechanically independent inductor structure;
   said first inductor, said second inductor, and said third inductor having the same inductance value;
   each of said first inductor, said second inductor, and said third inductor being an unshielded inductor;
   a first support coupled to said first inductor and said second inductor for separating said first inductor and said second inductor by a fixed distance with said first axial core and said second axial core maintained parallel to one another and defining a plane;
   a second support coupled to said third inductor for disposing said third inductor between said first inductor and said second inductor with said third axial core maintained parallel to said first axial core and said third axial core and lying in the plane defined by the first and second inductors;
   said first inductor, said second inductor, and said third inductor immersed in air wherein said first inductor, said second inductor, and said third inductor are inductively coupled through the air; and
   said first support and said second support configured for one-dimensional relative movement therebetween wherein said first axial core, said second axial core, and said third axial core remain parallel to one another during said relative movement as distance changes from said third inductor to each of said first inductor and said second inductor.

9. An inductive position sensor as in claim 8, further comprising:
   a source for supplying an oscillating current to said first inductor and said second inductor with a polarity of said oscillating current supplied to said first inductor being opposite to a polarity of said oscillating current supplied to said second inductor; and
   a device coupled to said third inductor for measuring voltage induced in said third inductor when said oscillating current is supplied to said first inductor and said second inductor.

10. An inductive position sensor as in claim 8, further comprising:
    a source for supplying an oscillating current to said third inductor; and
    a device coupled to said first inductor and said second inductor for measuring voltage induced in each of said first inductor and said second inductor when said oscillating current is supplied to said third inductor.

* * * * *